United States Patent [19]
Haunhorst et al.

[11] Patent Number: 5,415,200
[45] Date of Patent: May 16, 1995

[54] REFRIGERATION SYSTEM SERVICE ADAPTER

[75] Inventors: Gregory A. Haunhorst, Perrysburg; David S. Densel, Whitehouse, both of Ohio

[73] Assignee: Aeroquip Corporation, Maumee, Ohio

[21] Appl. No.: 254,634

[22] Filed: Jun. 8, 1994

Related U.S. Application Data

[63] Continuation of Ser. No. 164,052, Dec. 8, 1993, abandoned.

[51] Int. Cl.6 ............................................. F16L 37/28
[52] U.S. Cl. ......................... 137/614.05; 137/614.03; 251/264
[58] Field of Search ................. 137/614.05, 614.03, 137/614.06, 614.04; 251/149.6, 284, 286, 287, 288, 264

[56] References Cited

U.S. PATENT DOCUMENTS

| | | | |
|---|---|---|---|
| 4,384,705 | 5/1983 | Kato | 251/264 X |
| 5,139,049 | 8/1992 | Jensen et al. | 137/614.03 X |
| 5,339,862 | 8/1994 | Haunhorst | 137/614.05 |

Primary Examiner—Martin P. Schwadron
Assistant Examiner—Kevin L. Lee
Attorney, Agent, or Firm—Emch, Schaffer, Schaub & Porcello Co.

[57] ABSTRACT

A manually adjustable service adapter includes a manually adjustable actuation shaft for opening the valve of a charging port of a refrigeration system to permit the charging of refrigerant into such system. Actuation of such charging port results from an axially movable shaft in combination with one of two internal, axially slideable sleeves. The axially movable actuation shaft is manually adjustable by a rotatable knob which causes it to move axially but non-rotatably. Such axial movement of the shaft along with restriction of movement of one slideable sleeve upon abutment against the other slidable sleeve when the adapter is engaged to the charging port, opens the seal between the shaft and such one slideable sleeve while movement of the shaft with its end engaged to the valve of the charging port, opens such valve. Means are provided for preventing rotational movement of the axially movable shaft.

31 Claims, 5 Drawing Sheets

REFRIGERATION SYSTEM SERVICE ADAPTER

This is a continuation of application Ser. No. 08/164,052 filed on Dec. 8, 1993, now abandoned.

The present invention relates to a service adapter intended to direct refrigerant from a refrigerant supply source to a refrigeration system through a charging port which is normally attached to the refrigeration system and in communication therewith. It may also be used to evacuate refrigerant from a refrigeration system.

U.S. Pat. No. 5,139,049, assigned to the assignee of the present invention and incorporated herein by reference, discloses a service adapter having a sleeve valve and a manually operated valve seal which cooperate to maintain the adapter passage closed when the adapter is not connected to the charging port of the refrigeration system. As is well recognized, current environmental concerns are such that venting of refrigerants to the atmosphere is not acceptable; thus, the need to maintain the adapter passage closed when the adapter is not connected to the charging port. These concerns are reflected in the Surface Vehicle Recommended Practice SAE J639 (REV. NOV 91) issued by the Society of Automotive Engineers, Inc.

The design of the service adapter of the present invention is such that it may be shorter than the service adapter disclosed in U.S. Pat. No. 5,139,049. As a result it can be used in areas which are too confined for service adapters of the type disclosed in U.S. Pat. No. 5,139,049. It is particularly .suitable for use in automobile air-conditioning systems where space for installation of components is at a premium. As will be appreciated, a shorter service adapter requires less material than a longer one and, thus, is potentially less expensive.

Additionally, in contrast to the service adapter of U.S. Pat. No. 5,139,049 which utilizes a manual adjustment in which the shaft rotates while it is manually adjusted for axial movement, the design of the present service adapter permits the shaft to be adjusted axially within the adapter body without causing it to rotate. This is significant in that the valve and seal carried by such shaft is maintained in sealing engagement with the sleeve valve when the adapter is not connected to the charging port and any rotation of the shaft will cause the seal to rotate relative to the sleeve valve to which it is engaged causing premature wearing of the seal. Additionally, any rotation of the shaft will cause the end of the shaft which contacts the end of the poppet of the charging port to rotate relative to such poppet. Since some poppets have a rubber covering over the contacted end, any such rotation may damage such rubber covering.

Engagement of the service adapter of the present invention to a male coupling or charging port communicating with an air-conditioning system positions an axially movable shaft against the leading end of a valve which is axially movable in the charging port from a closed to an open position in response to axial movement of such valve by the shaft. The design of the adapter of the present invention is tailored so as to cause such leading end to be depressed to the precise extent necessary to cause maximum opening of the valve of such male coupling without exceeding the maximum coupling depression from the face of such male coupling as specified in SAE Service Vehicle Recommended Practice Standard J639 and to do so without rotational movement of the axially movable shaft. This is accomplished by a design which utilizes a pair of slideable sleeves, one of which encircles and sealingly engages the male coupling. As a result and in contrast to the adapter shown in U.S. Pat. No. 5,139,049 in which the slideable sleeve valve directly contacts the leading end of the male coupling or charging port, the adapter of the present invention permits the end of the male coupling member, when engaged to the present adapter, to bottom directly upon a stop affixed to the axially movable shaft. The engagement of the stop to such leading end precisely controls the depth to which the valve of such charging port will be depressed to insure maximum opening without exceeding the limit set forth in SAE Standard J639.

The adapter of the present invention is provided with a quick connect feature which permits the male coupling or charging port to be engaged without the necessity of retracting the locking sleeve of the adapter quick connect feature.

It is an object of the present invention to provide a new and improved service adapter for connecting refrigerant from a refrigerant supply source to a refrigeration system, particularly in a very confined space, and to do so efficiently and without significant leakage of refrigerant to the atmosphere.

It is an additional object of the present invention to provide a manually adjustable service adapter in which the valve seal may be o manually adjusted for axial movement while being maintained in a fixed non-rotatable position.

It is a further object of this invention to provide a service adapter which can be affixed to a charging port without loss of fluid even if the manual adjuster is in the fully open position.

it is yet another object of the present invention to provide a manually adjustable service adapter designed to minimize tolerance variations such that the actuation shaft will provide maximum engagement into the charge port to obtain maximum flow opening within the limitation of recommended standards of the Society of Automotive Engineers.

BEST MODE OF CARRYING OUT INVENTION

Figure 1:
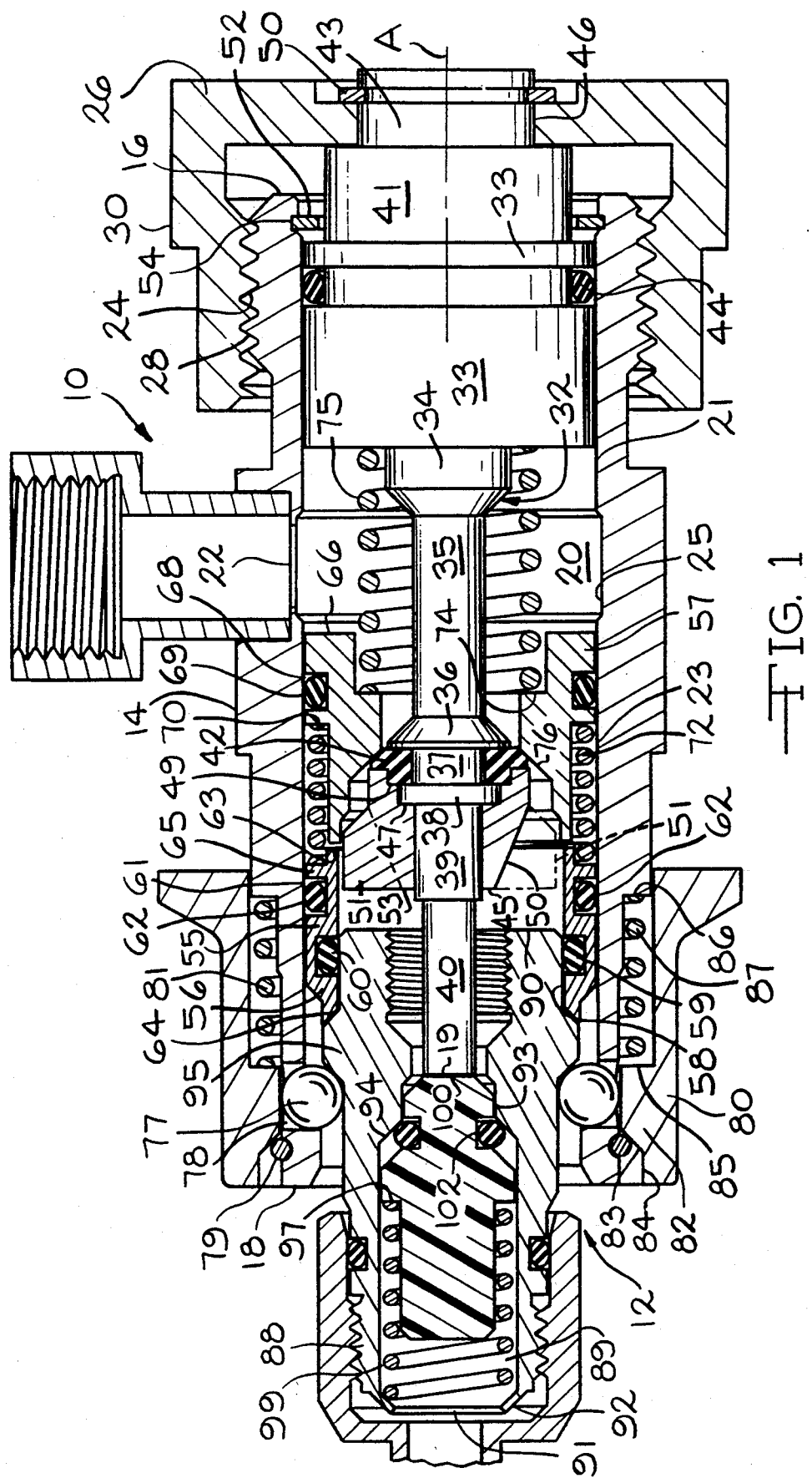
FIG. 1 is a sectional view of the service adapter of the present invention attached to a charging port of a refrigeration system with both the service adapter and charging port in a closed or sealed position.

Referring now to FIGS. 1-4, there is provided a service adapter 10 intended to be affixed to a male coupling or charging port 12 which functions as an inlet for refrigerant being introduced to a refrigeration system to which the charging port 12 is connected. When joined together, the service adapter 10 and the charging port 12 have a common longitudinal axis A.

The charging port 12 is typical of those commonly used and, in and or itself, forms no part of the present invention. It includes a body 88 having a central passage 89 extending therethrough from an inlet end 90 to an outlet end 91 having a radially inwardly deformed annular lip 92. The central passage 89 includes a reduced diameter cylindrical valve seat 93 having a conical shoulder 94 and internal threads adjacent the inlet end for receiving a dust cap (not shown) which is removed prior to engagement of the service adapter 10 thereto. The body is provided with an annular enlarged shoulder 95 which is provided for use in retaining the charging port 12 in engagement with the service adapter 10. An exterior cylindrical wall 96 extends between the inlet end 90 and the shoulder 95.

Figure 2:
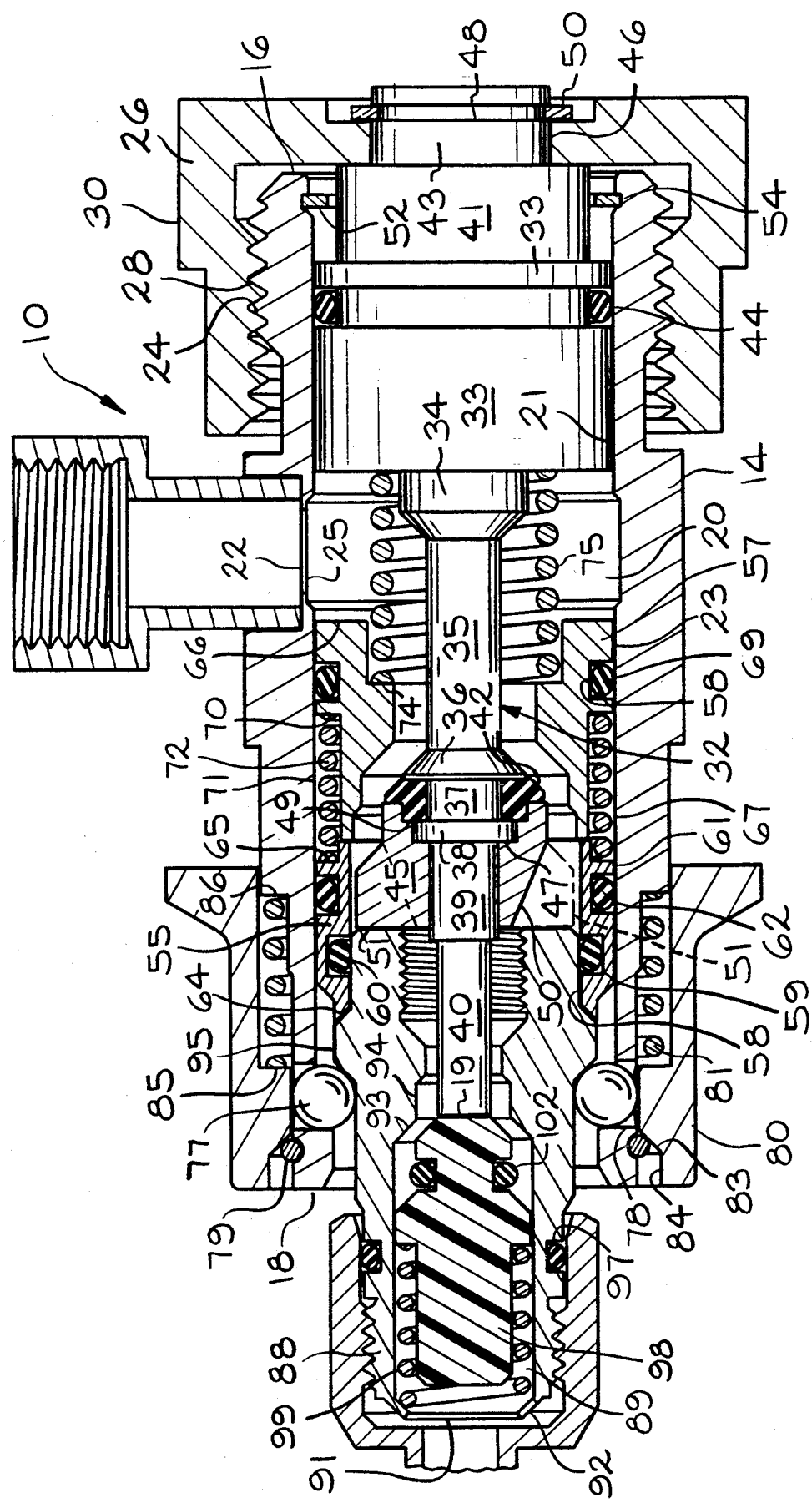
FIG. 2 is a view similar to FIG. 1 showing the relative positions of the parts with both in an open position following manual adjustment to move the shaft and seal of the service adapter axially to the left as shown in FIG. 2.

An axially displaceable poppet valve 98 is mounted within the passage 89 of the charging port body 88 and has a groove formed therein for receiving an annular elastomeric seal 102. When the valve 98 is closed, the seal 102 will sealingly engage the cylindrical valve seat 93. The poppet valve 98 may have a flat end 100 perpendicular to the axis A and centrally positioned on the axis A. A compression spring 99 extends between the annular lip 92 and a radial shoulder 97 on the poppet valve 98 to yieldingly urge the poppet valve 98 toward the inlet end 90 and to cause the elastomeric seal 102 to sealingly engage the cylindrical valve seat 93. Movement of the poppet valve 98 toward the outlet end 91 (to the left as viewed in FIGS. 1-4) disengages the annular seal 102 from the cylindrical valve seat 93 thereby opening the poppet valve 98 as shown in FIG. 2 to permit the flow of refrigerant through the charging port 12.

The service adapter 10 includes a body portion 14 which extends from an adjustment end 16 to an outlet end 18. A central passage 20 extends from the adjustment end 16 to the outlet end 18 and communicates with a lateral port 22 formed in the body portion 14 between the adjustment end 16 and outlet end 18. Externally disposed threads 24 are formed on the body portion 14 adjacent the adjustment end 16. A rotatable knob 26 having internal threads 28 is engaged to the threads 24 and has an enlarged gripping portion 30 in an area of the knob 26 which extends axially beyond the adjustment end 16 of the body portion 14.

The passage 20 of the body portion 14 includes a first cylindrical section 21 in the vicinity of the adjustment end 16, a second cylindrical section 23 and an enlarged area 25 aligned with lateral port 22 positioned between said first and second cylindrical sections 21 and 23. Preferably, the first and second cylindrical sections have the same diameter.

Positioned within the passage 20 is an actuation shaft 32 which extends from a head 33 sized to be snugly but slidingly received in the first cylindrical section 21 to a free end 19 near the outlet end 18. The head 33 has an annular groove defined thereon for receiving an elastomeric seal ring 44 which is slidingly but sealingly engaged to the first cylindrical section 21.

The actuation shaft 32 includes a first cylindrical section 34, a second cylindrical section 35 of reduced cross-sectional size, an enlarged valve head 36, a third cylindrical section 37, an enlarged shoulder 38, a fourth cylindrical section 39, and an axial probe 40 extending therefrom to the free end 19. The enlarged valve head 36 and the shoulder 38 cooperate to defining an annular groove, the bottom of which is the third cylindrical section 37. An elastomeric seal ring 42 is positioned in the annular groove. The presence of the enlarged valve head 36 and the shoulder 38 permits the elastomeric seal ring 42 to be retained in the groove 37 without the use of adhesive or other bonding medium.

Figure 5:
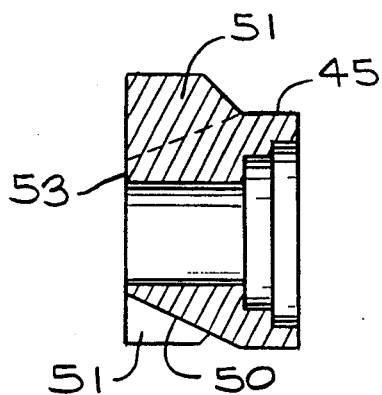
FIG. 5 is a sectional view of the stop member taken through line 5—5 of FIG. 6.
Figure 6:
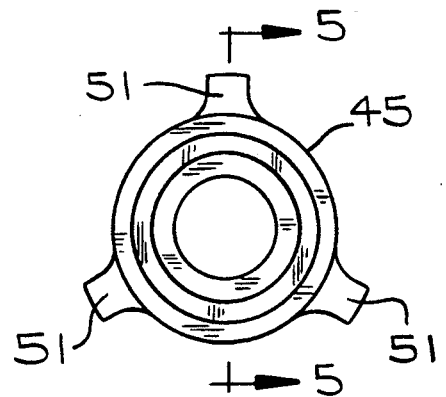
FIG. 6 is an end view of the stop member as viewed from the right in FIG. 5.

Outwardly from the head 33 toward the adjustment end 16, the actuation shaft 32 also includes a first cylindrical extension 41 having a diameter smaller than the diameter of the head 33 and a second cylindrical extension 43 having yet a smaller diameter. The second cylindrical extension 43 extends through a circular opening 46 in the rotatable knob 26 and has an annular groove 48 in which is positioned a split lock ring 50 for retaining the rotatable knob 26 to such second cylindrical extension 43. The rotatable knob 26 is thus maintained axially positioned with respect to the actuation shaft 32 on one side by abutting the lock ring 50 and on the other side by the shoulder between the first cylindrical extension 41 and the second cylindrical extension 43. Rotation of the rotatable knob 26 may be had without causing rotating the actuation shaft 32 due to the fact that both the second cylindrical section 43 and the opening 46 are circular. Although there could be some frictional drag between such opening 46 and second cylindrical extension 43, it will be less than friction drag between the larger diameter head 33 engaging the first cylindrical section 21 due to the greater surface area of contact between the head 33 and first cylindrical section 21 than between the second cylindrical extension 43 and the wall defined by the circular opening 46. However, if desired positive means of preventing rotation may be provided as will be described in the embodiment of FIGS. 5 and 6.

Rotation of the knob 26 and the axial movement thereof resulting from inter-engagement of the threads 24 and 28, thus causes the axial movement of the shaft 32 to (1) retract it toward the adjustment end 16 (to the right in FIGS. 1-4) upon rotation of the knob 26 in one direction and (2) extend it toward the outlet end 18 upon rotation of the knob 26 in the opposite direction.

Excessive retraction of the shaft 32 toward the adjustment end 16 is prevented by means of second split ring 52 positioned in an inwardly facing groove 54 formed adjacent the adjustment end 16 of the body portion. The second split ring 52 will engage the shoulder between the end of the head 33 and the first cylindrical extension 41 to prevent excessive axial movement of the actuation shaft 32 toward the adjustment end 16.

Mounted on the fourth section 39 and adjacent enlarged shoulder 38 of the actuation shaft 32 is a stop 45 having a first shoulder 47 abutting the outlet side of the enlarged shoulder 38. The stop 45 has an upstream end and a second shoulder 49, both of which are engaged to the elastomeric seal ring 42. The stop has a wall 50 tapering inwardly toward the axis A in the direction of the outlet end 18. A plurality of wings 51, preferably three in number, extend outwardly from the wall 5D. The wall 50 and the wings 51 have a common end 53.

Slideably positioned within the second cylindrical section 23 of the body portion 14 are an internal locking sleeve 55 and an internal safety sleeve 57, both of which encircle the actuation shaft. 32.

The internal locking sleeve 55 has a cylindrical internal wall 58 which is sized to receive the exterior cylindrical wall 96 of the charging port 12. An annular groove 59 is formed in the cylindrical internal wall 58 in which is positioned an O-ring 60 which sealingly engages the external cylindrical wall 96 when the charging port 12 is engaged. The internal safety sleeve 57 is also provided with an external or outwardly facing annular groove 61 in which is positioned another O-ring 62 which is sealingly engaged with the wall of the second cylindrical section 23 of the charging port body portion 14. The internal locking sleeve extends from an inlet end 63 which is substantially flat and disposed on a plane perpendicular to the axis A to an outlet end defined by a tapered wall 64 extending outwardly from the axis A in a direction toward the outlet end 18 and shaped to be engaged by the shoulder 95 of the charging port 12 upon introduction of the charging port 12 into the service adapter 10. The internal locking sleeve 55 is also provided with a radially outwardly facing shoulder 65 spaced from the inlet end 63.

The internal safety sleeve 57 extends from an inlet end 66 in the vicinity of the lateral port 22 to an outlet end 67 facing toward the internal locking sleeve 55. The safety sleeve 57 has an outwardly facing groove 58 in the vicinity of the inlet end 66 in which is positioned an annular seal 69 which sealingly engages the internal wall of the second cylindrical section 23. A flange adjacent the groove 68 defines a shoulder 70. The exterior of the safety sleeve 57 is recessed inwardly from the wall of the second cylindrical section 23 in the area from the shoulder 70 to the outlet end 67. The recessed area and shoulder 70 cooperate with the shoulder 65 of the internal locking sleeve 55 to form a chamber 71 in which is positioned a compression spring 72 the opposing ends of which engage the respective shoulders 65 and 70. The spring 72 acts to urge the internal locking sleeve 55 away from the internal safety sleeve 57.

The safety sleeve has an outwardly tapering sealing surface 76 sized and shaped to be sealingly engaged by the seal 42 of the valve head 36 of the actuation shaft 32.

The internal safety sleeve 57 is also provided with an inwardly directed shoulder 74 spaced from the inlet end 66 upon which rests one end of a second compression spring 75 which encircles the first cylindrical section 34 and second cylindrical section 35, of the actuation shaft 32. The other end of the second compression spring 75 rests against the head 33 of the actuation shaft. The second compression spring 75 yieldingly urges the internal safety sleeve 57 away from the head 33.

The service adapter 10 is connected to the charging port 12 by a plurality of detent balls 77 located within radial holes 78 defined in the wall of the body portion 14 adjacent the outlet end 18. The area of the body portion 14 between the radial holes 78 and the outlet end 18 is provided with an outwardly facing annular groove in which is positioned a retaining ring 79. An annular locking sleeve 80 encircles the body portion 14 adjacent the outlet end 18 and is axially slideably displaceable thereon. The locking sleeve 80 is biased toward the outlet end 18 by a compression spring 81. The locking sleeve 80 is provided with an inwardly facing shoulder 82 and a conical cam surface 83 flaring outwardly therefrom in a direction toward the outlet end 18 which joins with an internal cylindrical wall section 84 adjacent the outlet end. Extending radially outwardly from the upstream end of the shoulder 82 is a radial flange 85 which cooperates with an outwardly directed flange 86 of the body portion 14 and with the internal wall of the locking sleeve 80 and exterior wall of the body portion 14 to define a chamber in which said compression spring 81 is positioned to yieldingly urge the locking sleeve 80 toward the outlet end 18.

Figure 3:
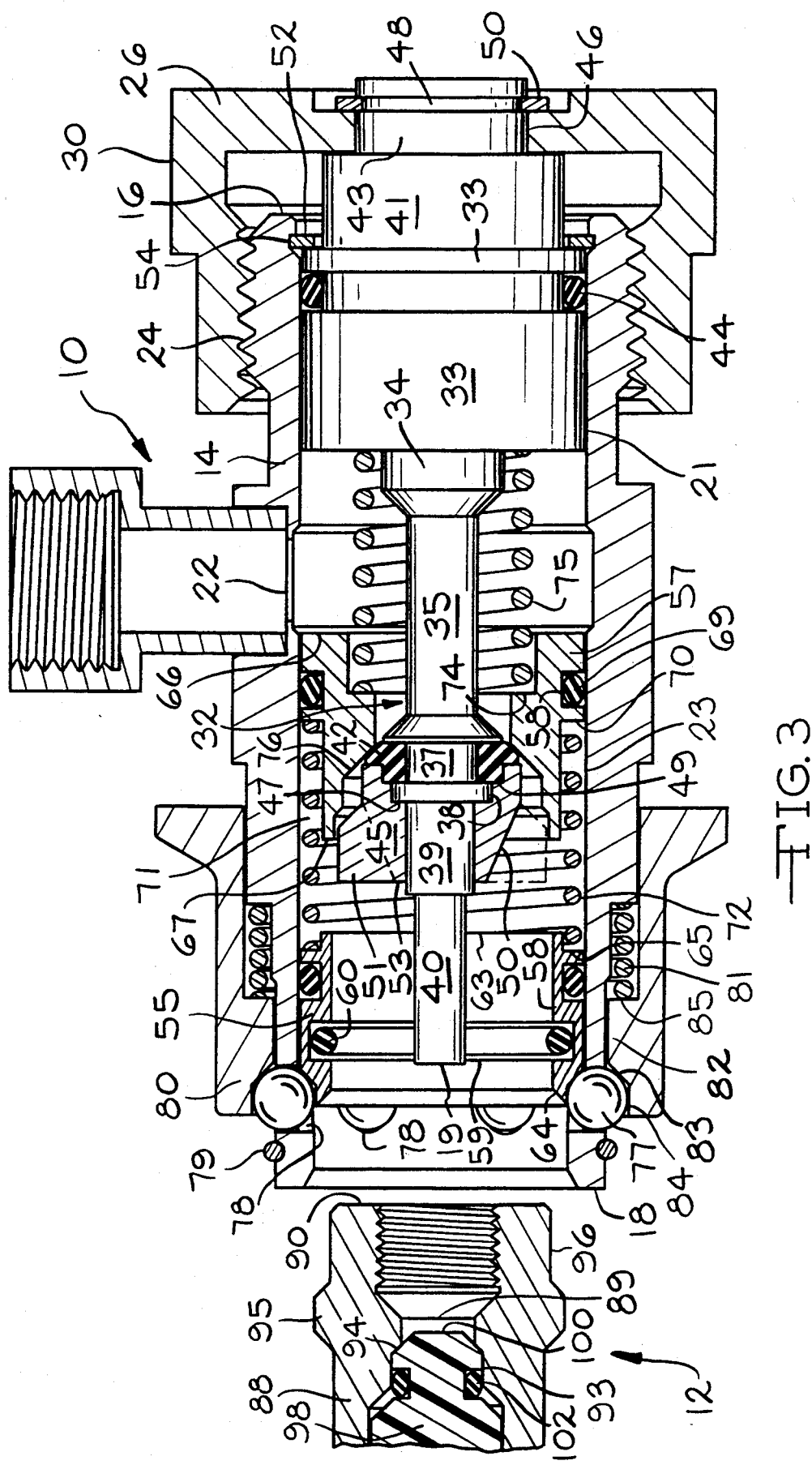
FIG. 3 is a view of the service adapter and a fragmentary view of the charging port in a disconnected position.
Figure 4:
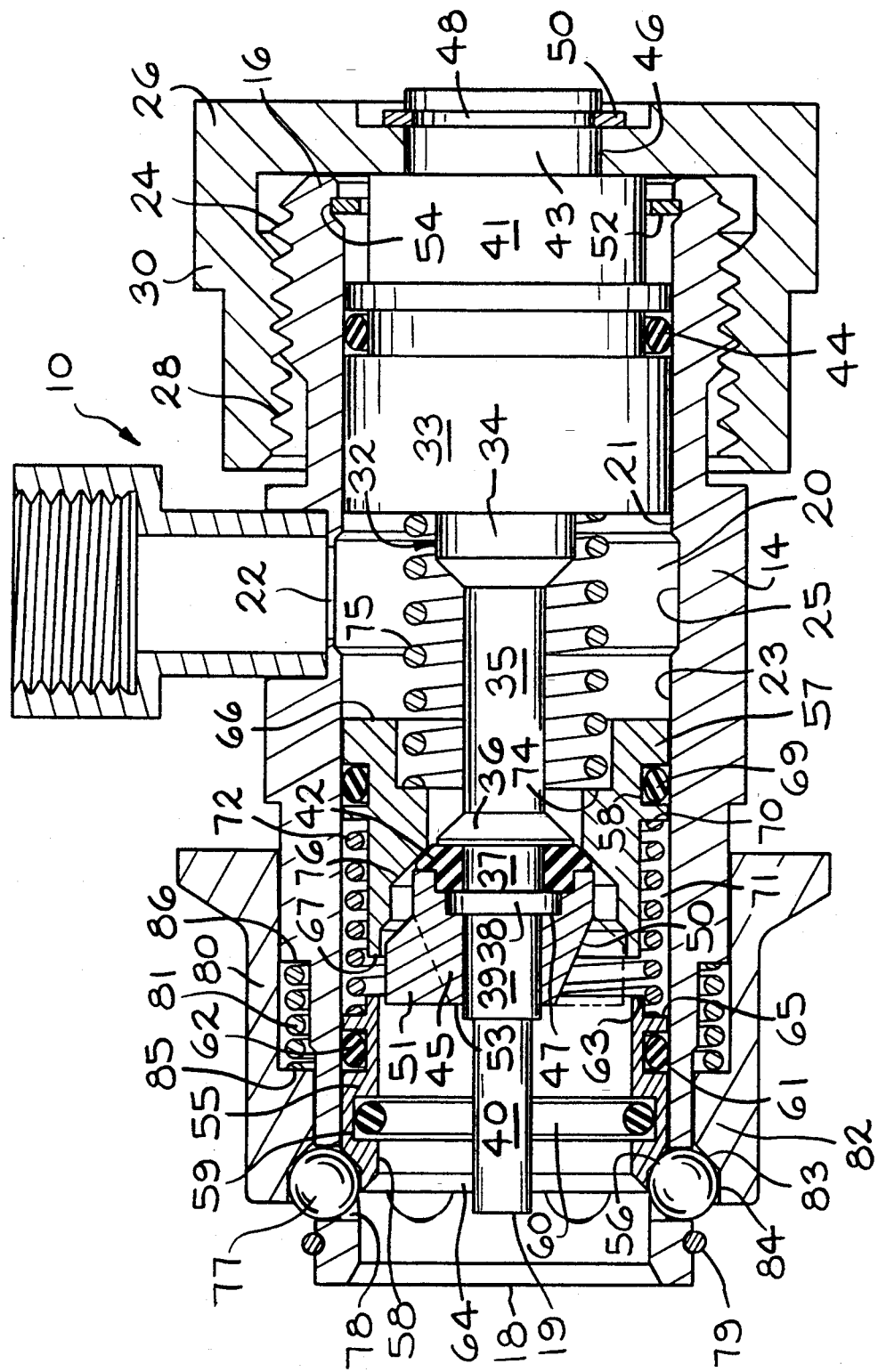
FIG. 4 is a view similar to FIG. 3 showing the shaft and sleeves following manual adjustment of the shaft to its maximum axial position toward the outlet end.

As can be seen in FIGS. 3 and 4, when the service adapter 10 is disengaged from the charging port 12, the locking sleeve 80 is in a retracted position and is held in such position by the detent balls 77 engaging the camming surface 83 and being held in position by the outwardly facing tapered shoulder 56 of the internal locking sleeve 55.

In operation, when the service adapter 10 is disengaged from the charging port 12, the locking sleeve 80 will be in its retracted position shown in FIG. 3 and held in such position by the detent balls 77 engaging the camming surface of shoulder 82 of the locking sleeve 80. The service adapter 10 may then be engaged to the charging port 12 without the necessity of the operator manipulating the locking sleeve to a retracted position. As the service adapter 1D engages the charging port 12, the inlet end 90 of the charging port 12 will enter into the outlet end 18 to a position at which the shoulder 95 of the charging port 12 engages the tapered wall of the outlet end 64 of the locking sleeve 55. Continued movement of the charging port 12 into the service adapter 10 will cause the locking sleeve 55 to be urged toward the adjustment end 16 overcoming the biasing action of the compression spring 72. The O-ring 60 becomes sealingly engaged with the external cylindrical wall 96 of the charging port 12. Axial movement of the locking sleeve 55 toward the adjustment end 16 releases the detent balls 77 to move radially inwardly into engagement with the portion of the shoulder 95 furthest removed from the charging port inlet end 90 thereby securely engaging the service adapter 10 to the charging port 12. It should be noted that the detent balls 77, upon release by movement of the locking sleeve 55 toward the adjustment end 16 are forced radially inwardly as a result of urging of the locking sleeve 80 toward the outlet end 18 in response to urging of the compression spring 81 and the action of the conical cam surface 83 forcing the detent balls 77 radially inwardly. This is the position shown in FIG. 1. The axial movement of the locking sleeve 80 toward the outlet end is stopped as result of engagement of the conical camming surface 83 with the retaining ring 79.

With the service adapter 10 and the charging port 12 thus engaged, it should be noted that there is no flow of fluid through the joined parts as both the service adapter 10 and the charging port 12 are closed to the flow of fluid therethrough. Thus, in the charging port 12 the elastomeric seal 102 is engaged to the valve seat 93 and in the service adapter 10, the seal ring 42 is sealingly engaged to the tapered internal sealing surface 76 of the internal safety sleeve 57.

In order to open the service adapter and the charging port to the flow of fluid entering through the lateral port 22, the rotatable knob 26 is rotated in the clockwise direction to the position shown in FIG. 2. Such rotation of the knob 26 does not cause rotation of the actuation shaft 32 as a result of frictional resistance to such rotation by virtue of the surface of the head 33 engaging the internal wall of the first cylindrical section 21 being greater than the frictional force caused by the second cylindrical section 43 engaging the wall of the circular opening 46; however, such rotation of the rotatable knob 26 will cause the actuation shaft 32 to move axially as the knob moves axially. Such axial movement of the actuation shaft 32 from the position of FIG. 1 to the position of FIG. 2 causes the end 53 of the stop 45 and, more particularly, its wings 51 to directly engage the inlet end 90 of the charging port 12. As the actuation shaft 32 moves toward the position shown in FIG. 2, the free end 19 engages the button 100 of the poppet valve 98 with continued axial movement of the actuation shaft 32 moving the poppet valve 98 away from the inlet end 90 against the biasing action of the spring 99 and thereby disengaging the elastomeric seal 102 from the valve seat 93 thus opening the charging port 12 to the flow of fluid therethrough. As previously discussed, under the standards presently in effect by the Society of Automotive Engineers (SAE J639), the maximum distance to which the end of the button 100 of the poppet valve 98 should be depressed should be an amount such that the end of the button 100 is 8.3 mm from the inlet end 90 of the charging port 12. Under the present invention, the fact that the common end 53 of the wings 51 and the remainder of the stop 45 and the free end 19 of the actuation shaft 32 are always in a fixed position with respect to their relative axial spacing and the fact that the wings 51 have their common ends 3 in direct engagement with the inlet end 90 of the charging port 12 precisely controls the extent to which the poppet valve 98 may be depressed.

In order to disconnect the service adapter 10 from the charging port 12, it is simply necessary to manually retract the locking sleeve 80 to the position shown in FIG. 3. The retracting of such sleeve 80 moves the shoulder 82 of the locking sleeve 80 out of engagement with the detent balls 77 and thereby aligns the detent balls with the enlarged cylindrical wall 84 thereby permitting the detent balls to move radially outwardly to disengage them from the shoulder 95 of the charging port 12. Such radial movement of the detent balls 77 also permits the internal locking sleeve 55 to move axially toward the outlet end 18 in response to the force of the compression spring 72. Although it is preferred that the actuation shaft 32 is in the retracted position of the FIGS. 1 and 3 at the time of such disengagement, it is clear from FIG. 4 that the service adapter 10 will become sealed upon its disengagement from the charging port 12 even if the actuation shaft 32 remains in the extended position of Figs, 2 and 4. This is due to the fact that the compression spring 75 acting to urge the internal safety sleeve 57 toward the outlet end 18 is designed to exert a greater compressive force than the compression spring 72. As a result of the greater compressive force exerted by the second compression spring 75, the internal safety sleeve 57 will overcome any resistance of the compression spring 72 and urge the internal safety sleeve 57 and its tapered sealing surface 76 into sealing engagement with the seal ring 42 even when the actuation shaft is in its furthest most extended position shown in FIG. 4. It will be appreciated that the opening of the service adapter 10 by removing the seal ring 42 from its sealing engagement with the internal safety sleeve 57 can only occur in response to the positive movement of the safety sleeve 55 thereagainst toward the adjustment end 16 and that such positive movement of the safety sleeve 55 can occur only when the charging port 12 is engaged to the surface adapter 10.

If the coupling is connected when the shaft is in the fully extended position, the O-ring 60 will sealingly engage cylindrical wall 96 prior to the opening of the poppet valve 98 thus preventing any spurting or leakage of fluid. This is believed to be a significant advantage over the prior art.

Figure 7:
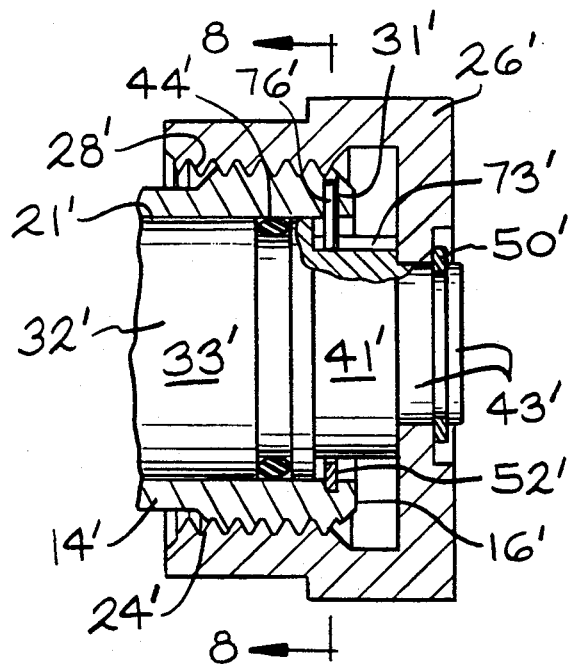
FIGS. 7 and 8 are fragmentary sectional views of an alternative embodiment incorporating means for positively preventing rotation between the actuation shaft and the body portion of the service adapter.
Figure 8:
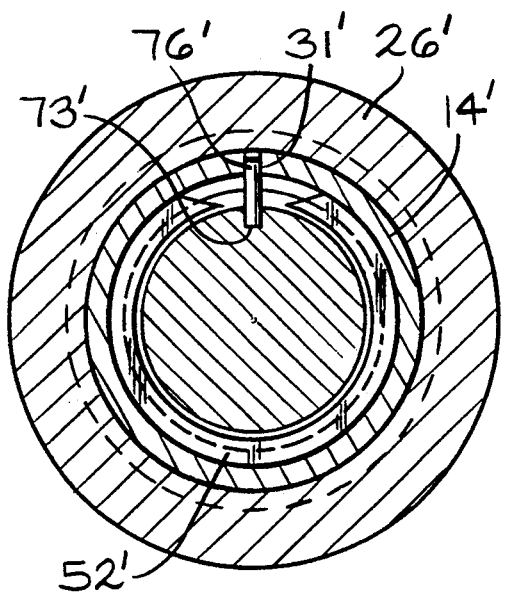

Referring to FIGS. 7 and 8, if desired means may be provided for an inter-engagement between the body portion and the actuation shaft to positively prevent rotation of the actuation shaft within the body portion while permitting axial movement. As shown in FIGS. 7 and 8, there is provided a modified body portion 14' having a head 33' axially slideably movable therein. A seal ring 44' engages the wall of the first cylindrical section 21' of the body portion 14' to prevent the flow of fluid out of the adjustment end 16'. Extending from the head 33' is a first cylindrical extension 41' and a second cylindrical extension 43'. The first cylindrical extension 41' has formed in its outer surface a longitudinally extending slot 73'. A radially extending passageway 31' is formed in the wall of the body portion 14' spaced a small distance from the adjustment end 16'. With the longitudinal slot 73' aligned with the radial passageway 31', a pin 76' is inserted and frictionally engaged in the passageway 31' to a position such that its leading end extends into the longitudinal slot 73'. The positioning of the pin 76' thus inter-engages the actuation shaft 32' and the body portion 14' to prevent rotation of the shaft 32 in the body portion 14' while permitting axial movement. The rotatable knob 26' is engaged to the body portion 14' by means of the inter-engaging threads 24' and 28' and to the actuation shaft 32' by means of the split lock ring 50' similar to the previous embodiment of FIGS. 1–4. Rotation of the rotatable knob 26' causes it and the inter-engaged actuation shaft 32' to move axially relative to the body portion 14'; however, rotational movement of the actuation shaft 32' in the body portion 14' is prevented by means of the pins 76' engaged in the longitudinal slot 73'. The longitudinal slot 73', however, does permit the pin 76' to move axially therein.

Many modifications will become readily apparent to those skilled in the art. Accordingly, the scope of this invention should be limited only by the scope of the claims appended hereto.

We claim:

1. A service adapter for connecting refrigerant from a supply source to a refrigeration system having an inlet coupling comprising:
    (a) a body portion having a central passageway extending along an axis from an adjustment end to an outlet end and a lateral port positioned between said ends providing communication to said passageway for refrigerant from said supply source, said central passageway having a first cylindrical section between said adjustment end and said lateral port and a second cylindrical section between said lateral port and said outlet end;
    (b) an axially movable shaft in said passageway extending from a first end positioned between said lateral port and said outlet end to a second end in the area of said adjustment end, said second end including a seal slidingly engageable with said first cylindrical section and a sealing gasket in the area between said first end and said lateral port;
    (c) a first sleeve member axially movable in said second cylindrical section, said first sleeve member having (i) an inlet end, (ii) an outlet end, (iii) a seal sealingly and slideably engaged with said second cylindrical section and (iv) an annular abutment sized and positioned to be sealingly engageable with said shaft sealing gasket;

(d) a first spring yieldingly urging said first sleeve member toward said outlet end;

(e) a second sleeve member axially movable in said second cylindrical section positioned between said first sleeve member and said outlet end and having (i) an inlet end; (ii) an outlet end; (iii) an outwardly facing annular seal slideably engaged with said second cylindrical section and (iv) an inwardly facing annular seal;

(f) a second spring yieldingly urging said second sleeve member axially away from said first sleeve member;

(g) a connector releaseably engaging said service adapter to an inlet coupling sized to be inserted into said second cylindrical section, said inlet coupling having (i) an end face encircling an opening, (ii) an abutment engageable with said second sleeve member outlet end and (iii) an axially displaceable valve engageable with said shaft first end; said second sleeve member being axially displaced toward said first sleeve member upon insertion of said inlet coupling into said second cylindrical section; and (h) an actuator for moving said shaft axially from a rearward position toward said adjustment end to a forward position toward said outlet end, said axial movement causing said shaft sealing gasket to become disengaged from said first sleeve annular abutment following abutting engagement between said second sleeve member and said first sleeve member.

2. A service adapter according to claim 1, wherein said second sleeve member inwardly facing annular seal is positioned to sealingly engage said inlet coupling prior to said shaft first end engaging said inlet coupling axially displaceable valve when said shaft is in the forward position.

3. A service adapter according to claim 1, wherein said body portion has external threads at said adjustment end and said actuator includes (i) a rotatable knob having internal threads engaged to said external threads, rotation of said knob resulting in axial movement thereof on said body portion and (ii) interengageable abutments between said knob and said shaft causing non-rotatable axial movement of said shaft upon rotation of said knob.

4. The service adapter of claim 3, wherein engagement of said shaft second end and said slidingly engageable seal with said body portion first cylindrical section causes frictional resistance to rotation in excess of frictional forces tending to cause rotation of said shaft upon rotation of said rotatable knob.

5. The service adapter of claim 3, wherein engagement of said shaft second end and said slidingly engageable seal with said body portion first cylindrical section causes frictional resistance to rotation in excess of forces created between said interengageable abutments upon rotation of said rotatable knob tending to cause rotation of said shaft.

6. The service adapter of claim 3 further including a longitudinally extending slot on said shaft parallel to said axis and a rigid member engaged to said body portion extending into said slot, said rigid member slideable in said slot upon rotation of said rotatable knob and preventing rotation of said shaft relative to said body portion.

7. The service adapter of claim 1, wherein said first and second cylindrical sections are the same diametrical size.

8. The service adapter of claim 1, wherein said actuation shaft includes a stop engageable with said coupling end face, said stop limiting the distance said shaft may be inserted in said coupling.

9. A service adapter according to claim 2, wherein said body portion has external threads at said adjustment end and said actuator includes (i) a rotatable knob having internal threads engaged to said external threads, rotation of said knob resulting in axial movement thereof on said body portion and (ii) interengageable abutments between said knob and said shaft causing non-rotatable axial movement of said shaft upon rotation of said knob.

10. The service adapter of claim 9, wherein engagement of said shaft second end and said slidingly engageable seal with said body portion first cylindrical section causes frictional resistance to rotation in excess of frictional forces tending to cause rotation of said shaft upon rotation of said rotatable knob.

11. The service adapter of claim 9, wherein engagement of said shaft second end and said slidingly engageable seal with said body portion first cylindrical section causes frictional resistance to rotation in excess of forces created between said interengageable abutments upon rotation of said rotatable knob tending to cause rotation of said shaft.

12. The service adapter of claim 9 further including a longitudinally extending slot on said shaft parallel to said axis and a rigid member engaged to said body portion extending into said slot, said rigid member slideable in said slot upon rotation of said rotatable knob and preventing rotation of said shaft relative to said body portion.

13. The service adapter of claim 9, wherein said first and second cylindrical sections are the same diametrical size.

14. A service adapter for use with a coupling communicating with a fluid system, said coupling including a housing extending from a first end to a second end and having a longitudinal passageway extending between said first and second ends and communicating with said fluid system in the area of said second end, said coupling having a valve longitudinally movable in said passageway from a closed mode when in a first longitudinal position to an open mode when in a second longitudinal position, said valve being spaced further from said first end when positioned in said second longitudinal position than when in said first longitudinal position, said adapter comprising:

(a) a body portion extending from an adjustment end to an outlet end and having a longitudinal passageway extending along an axis between said adjustment end and said outlet end and having a lateral port communicating with said passageway, said passageway including a cylindrical section between said port and said outlet end, said outlet end having an opening centered on said axis sized to receive said coupling;

(b) an actuation shaft mounted in said passageway for axial movement therein, said actuation shaft including (i) an axially aligned probe extending to a free end positioned to engage said coupling valve when said coupling is positioned in said outlet end, (ii) a stop engageable with said coupling first end for limiting the depth to which said probe free end may extend into said coupling and (iii) a valve head having a seal;

(c) first and second sleeve members encircling said actuation shaft positioned for movement in said cylindrical section;

(d) a first spring yieldingly urging said first and second sleeve members apart;

(e) said first sleeve member having a sealing face positioned for engagement with and disengagement from said valve head seal, the engagement of said sealing face with said valve head seal limiting the axial movement of said first sleeve member toward said probe free end;

(f) said second sleeve member being movable from a forward position near said outlet end to a retracted position further away from said outlet end in response to movement of said charging port into said body portion, said second sleeve member having an inwardly facing annular seal for sealingly engaging said coupling;

(g) a second spring urging said first sleeve member toward said second sleeve member with a greater force than said first spring yieldingly urging said first and second sleeve members apart; and (h) an actuator for moving said actuation shaft axially.

15. The service adapter of claim 14, wherein said second sleeve member inwardly facing annular seal sealingly engages said coupling prior to said probe opening said coupling valve in all axial positions of said actuation shaft.

16. The service adapter of claim 15, wherein said body portion has external threads at said adjustment end and said actuator includes (i) a rotatable knob having internal threads engaged to said external threads, rotation of said knob resulting in axial movement thereof on said body portion and (ii) interengaged abutments between said knob and said shaft causing non-rotatable axial movement of said shaft upon rotation of said knob.

17. The service adapter of claim 16, wherein frictional resistance of said shaft in said passageway prevents rotation of said shaft upon rotation of said knob.

18. The service adapter of claim 16 further including a longitudinally extending slot on said shaft parallel to said axis and a rigid member engaged to said body portion extending into said slot, said rigid member slideable in said slot upon rotation of said rotatable knob and preventing rotation of said shaft relative to said body portion.

19. A service adapter for use with a coupling communicating with a fluid system, said coupling including a housing extending from a first end to a second end and having a longitudinal passageway extending between said first and second ends, and communicating with said fluid system in the area of said second end, said coupling having a valve longitudinally movable in said passageway from a closed mode when in a first longitudinal position to an open mode when in a second longitudinal position, said valve being spaced further from said first end when positioned in said second longitudinal position than when in said first longitudinal position, said adapter comprising:

(a) a body portion extending from an adjustment end to an outlet end and having a longitudinal passageway extending along an axis between said adjustment end and said outlet end and having a lateral port communicating with said passageway, said passageway including a cylindrical section between said port and said outlet end, said outlet end having an opening centered on said axis sized to receive said coupling;

(b) an actuation shaft mounted in said passageway for axial movement therein, said actuation shaft including (i) an axially aligned probe extending to a free end positioned to engage said coupling valve when said coupling is positioned in said outlet end, (ii) a stop engageable with said coupling first end for limiting the depth to which said probe free end may extend into said coupling and (iii) a valve head having a seal;

(c) first and second sleeve members encircling said actuation shaft positioned for movement in said cylindrical section;

(d) a first spring yieldingly urging said first and second sleeve members apart;

(e) said first sleeve member having a sealing face positioned for engagement with and disengagement from said valve head seal means, the engagement of said sealing face with said valve head seal means limiting the axial movement of said first sleeve member toward said probe free end;

(f) said second sleeve member being movable from a forward position near said outlet end to a retracted position further away from said outlet end in response to movement of said charging port into said body portion, said second sleeve member having an inwardly facing annular seal for sealingly engaging said coupling;

(g) a second spring urging said first sleeve member toward said second sleeve member with a greater force than said first spring yieldingly urging said first and second sleeve members apart; and (h) an actuator for moving said actuation shaft axially, whereby movement of said actuation shaft toward said outlet end when said second sleeve member is held in said retracted position by said engaged coupling permits said first sleeve to be urged by said second spring into engagement with said second sleeve, the continued movement of said actuation shaft (A) displacing said valve head seal from said first sleeve sealing face and, (B) moving said coupling valve longitudinally to an open position, to thereby open flow for fluid from said lateral port through said coupling.

20. A service adapter according to claim 19, wherein said second sleeve member inwardly facing annular seal is positioned to sealingly engage said inlet coupling prior to said shaft first end engaging said inlet coupling axially displaceable valve when said shaft is in the forward position.

21. A service adapter according to claim 19, wherein said body portion has external threads at said adjustment end and said actuator includes (i) a rotatable knob having internal threads engaged to said external threads, rotation of said knob resulting in axial movement thereof on said body portion and (ii) interengageable abutments between said knob and said shaft causing non-rotatable axial movement of said shaft upon rotation of said knob.

22. The service adapter of claim 19, wherein frictional resistance of said shaft in said passageway prevents rotation of said shaft upon rotation of said knob.

23. The service adapter of claim 19 further including a longitudinally extending slot on said shaft parallel to said axis and a rigid member engaged to said body portion extending into said slot, said rigid member slideable in said slot upon rotation of said rotatable knob and preventing rotation of said shaft relative to said body portion.

24. A service adapter according to claim 20, wherein said body portion has external threads at said adjustment end and said actuator includes (i) a rotatable knob having internal threads engaged to said external threads, rotation of said knob resulting in axial movement thereof on said body portion and (ii) interengageable abutments between said knob and said shaft causing non-rotatable axial movement of said shaft upon rotation of said knob.

25. The service adapter of claim 20, wherein frictional resistance of said shaft in said passageway prevents rotation of said shaft upon rotation of said knob.

26. The service adapter of claim 20 further including a longitudinally extending slot on said shaft parallel to said axis and a rigid member engaged to said body portion extending into said slot, said rigid member slideable in said slot upon rotation of said rotatable knob and preventing rotation of said shaft relative to said body portion.

27. In a service adapter for adding refrigerant to a refrigeration system comprising a service adapter body, an axial flow passage defined in said body, a conduit fitting defined on said service adapter body in communication with said passage, releasable locking means to selectively lock said body in an aligned interconnected relationship with a compatible charging port, a manually actuated axially displaceable valve within said service adapter body, said manually activated valve including an annular seal, a sleeve member axially displaceable within said service adapter body passage, said sleeve member including a valve seat positioned to be sealingly engaged to said annular seal, a spring within said service adapter body passage biasing said sleeve member to a position in which said valve seat engages said annular seal, a rotatable knob threadedly engaged to said body and engaged to said manually actuated valve by a connector permitting rotation of said knob relative to said body without causing rotation of said manually actuated valve, said rotation causing axial displacement of said manually actuated valve between a retracted axial position and an extended axial position, said sleeve member valve seat being maintained in a sealed condition with said annular seal when said service adapter is disconnected from said charging port regardless of the axial position of said manually actuated valve, and when said service adapter body is fully connected to said charging port, said sleeve member being axially movable relative to said manually adjustable valve whereby movement of said manually actuated valve from said retracted position to said extended position separates said annular seal from said sleeve member valve seat, the improvement wherein said manually actuated valve has a first enlarged shoulder facing in a direction toward said releasable locking means and a second shoulder facing said first enlarged shoulder and cooperating therewith to define an annular groove in which said annular seal is positioned, said annular seal having a trailing face engaged to said first enlarged shoulder and a leading face engaged to said second shoulder, said leading face having an outer portion extending radially beyond said second shoulder and a stop member mounted on said manually adjustable shaft, said stop member engaged to said leading face outer portion.

28. The service adapter of claim 27 wherein said annular seal has an annular ledge extending from said leading face outer portion toward said trailing face and an annular shoulder extending outwardly from said annular ledge and said stop member engages at least one of said annular ledge and said annular shoulder.

29. In a service adapter for adding refrigerant to a refrigeration system comprising a service adapter body, an axial flow passage defined in said body, a conduit fitting defined on said service adapter body in communication with said passage, releasable locking means to selectively lock said body in an aligned interconnected relationship with a compatible charging port, a manually actuated axially displaceable valve within said service adapter body, said manually activated valve including an annular seal, a sleeve member axially displaceable within said service adapter body passage, said sleeve member including a valve seat positioned to be sealingly engaged to said annular seal, a spring within said service adapter body passage biasing said sleeve member to a position in which said valve seat engages said annular seal, a rotatable knob threadedly engaged to said body and engaged to said manually actuated valve by a connector permitting rotation of said knob relative to said body without causing rotation of said manually actuated valve, said rotation causing axial displacement of said manually actuated valve between a retracted axial position and an extended axial position, said sleeve member valve seat being maintained in a sealed condition with said annular seal when said service adapter is disconnected from said charging port regardless of the axial position of said manually actuated valve, and when said service adapter body is fully connected to said charging port, said sleeve member being axially movable relative to said manually adjustable valve whereby movement of said manually actuated valve from said retracted position to said extended position separates said annular seal from said sleeve member valve seat, the improvement wherein said manually actuated valve has a first enlarged shoulder facing in a direction toward said releasable locking means and a second shoulder facing said first enlarged shoulder and cooperating therewith to define an annular groove in which said annular seal is positioned, said annular seal being affixed to said manually adjustable valve in non-bonded relationship thereto.

30. In a service adapter for adding refrigerant to a refrigeration system having a charging port with an annular end defining an inlet, said service adapter comprising a body, an axial flow passage defined in said body, a conduit fitting defined on said service adapter body in communication with said passage, releasable locking means to selectively lock said body in an aligned interconnected relationship with said charging port, a manually actuated axially displaceable valve within said service adapter body, said manually activated valve including an annular seal, a sleeve member axially displaceable within said service adapter body passage, said sleeve member including a valve seat positioned to be sealingly engaged to said annular seal, a spring within said service adapter body passage biasing said sleeve member to a position in which said valve seat engages said annular seal, a rotatable knob threadedly engaged to said body and engaged to said manually actuated valve by a connector permitting rotation of said knob relative to said body without causing rotation of said manually actuated valve, said rotation causing axial displacement of said manually actuated valve between a retracted axial position and an extended axial position, said sleeve member valve seat being maintained in a sealed condition with said annular seal when said service adapter is disconnected from said charging port regardless of the axial position of said manually actuated valve, and when said service adapter body is fully connected to said charging port, said sleeve member being axially movable relative to said manually adjustable valve whereby movement of said manually actuated valve from said retracted position to said extended position separates said annular seal from said sleeve member valve seat, the improvement wherein said manually actuated valve has a stop member mounted thereon, said stop member engageable with said charging port annular end to limit the depth to which said manually actuated valve may extend into said charging port.

31. The service adapter according to claim 30 further including a second sleeve member axially movable in said service adapter body passage positioned between said axially displaceable sleeve member and said releasable locking means, said second sleeve member engaging said charging port when said service adapter is fully connected to said charging port to limit axial movement of said axially displaceable sleeve toward said charging port.

* * * * *